United States Patent
Imajou (10) Patent No.: US 8,306,116 B2
(45) Date of Patent: Nov. 6, 2012

(54) IMAGE PREDICTION APPARATUS AND METHOD, IMAGE ENCODING APPARATUS, AND IMAGE DECODING APPARATUS

(75) Inventor: Chikara Imajou, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 382 days.

(21) Appl. No.: 12/566,204

(22) Filed: Sep. 24, 2009

(65) Prior Publication Data

US 2010/0086033 A1  Apr. 8, 2010

(30) Foreign Application Priority Data

Oct. 3, 2008  (JP) ................. 2008-258783

(51) Int. Cl.
*H04N 7/12*  (2006.01)
(52) U.S. Cl. .................. 375/240.12; 375/240.02
(58) Field of Classification Search .............. None
See application file for complete search history.

(56) References Cited

U.S. PATENT DOCUMENTS

| | | | |
|---|---|---|---|
| 7,437,008 B2* | 10/2008 | Shen et al. | 382/238 |
| 2007/0160298 A1 | 7/2007 | Murakami et al. | |
| 2009/0067501 A1* | 3/2009 | Boon et al. | 375/240.16 |
| 2009/0129469 A1* | 5/2009 | Kimiyama et al. | 375/240.15 |
| 2009/0252229 A1* | 10/2009 | Cieplinski | 375/240.15 |
| 2009/0257492 A1* | 10/2009 | Andersson et al. | 375/240.12 |
| 2009/0317008 A1* | 12/2009 | Cho et al. | 382/238 |
| 2010/0208802 A1* | 8/2010 | Tsukuba et al. | 375/240.12 |
| 2010/0309977 A1* | 12/2010 | Andersson et al. | 375/240.12 |
| 2011/0007801 A1* | 1/2011 | Andersson et al. | 375/240.14 |
| 2011/0026586 A1* | 2/2011 | Boyce | 375/240.02 |
| 2011/0058611 A1* | 3/2011 | Sugimoto et al. | 375/240.16 |
| 2011/0235930 A1* | 9/2011 | Kim et al. | 382/238 |

FOREIGN PATENT DOCUMENTS

| | | |
|---|---|---|
| JP | 2002-223445 | 8/2002 |
| JP | 2006-81066 | 3/2006 |
| JP | 2006-108811 | 4/2006 |
| JP | 2007-184800 | 7/2007 |
| JP | 2008-199521 | 8/2008 |

OTHER PUBLICATIONS

Office Action issued by the Japanese Patent Office on Jul. 24, 2012 in the corresponding Japanese patent application no. 2008-258783.

* cited by examiner

*Primary Examiner* — Michael J Moore, Jr.
(74) *Attorney, Agent, or Firm* — Staas & Halsey LLP (57) ABSTRACT

An image predicting apparatus used in an image encoding apparatus or decoding apparatus and performing encoding or decoding of an image while performing image prediction processing for each macroblock, the image predicting apparatus comprises: a characteristic amount image extracting unit extracting characteristic amount image data from predicted image data obtained as a result of the image prediction processing; a characteristic amount image adjusting unit adjusting the characteristic amount image data according to the predicted image data; and a predicted image combining unit combining the adjusted characteristic amount image data obtained from the characteristic amount image adjusting unit and the predicted image data and outputting the composite predicted image.

13 Claims, 13 Drawing Sheets

PRIOR ART

FIG. 13A

PRIOR ART

FIG. 13B

PRIOR ART

IMAGE PREDICTION APPARATUS AND METHOD, IMAGE ENCODING APPARATUS, AND IMAGE DECODING APPARATUS

CROSS-REFERENCE TO RELATED APPLICATION

This application is based upon and claims the benefit of priority of the prior Japanese Patent Application No. 2008-258783, filed on Oct. 3, 2008, the entire contents of which are incorporated herein by reference.

FIELD

Various embodiments described herein relate to moving image encoding/decoding techniques.

BACKGROUND

In moving image encoding, a method for enhancing encoding efficiency by removing correlation between pictures by using inter-picture prediction is used. For example, in moving image encoding schemes such as ISO (International Organization for Standardization), MPEG (Moving Picture Experts Group)-1/MPEG-2/MPEG-4/MPEG-4-AVC (Advanced Video Coding), and ITU-T (International Telecommunication Union Telecommunication Standardization Sector) H.264, prediction efficiency is enhanced by inter-picture prediction.

Figure 11:
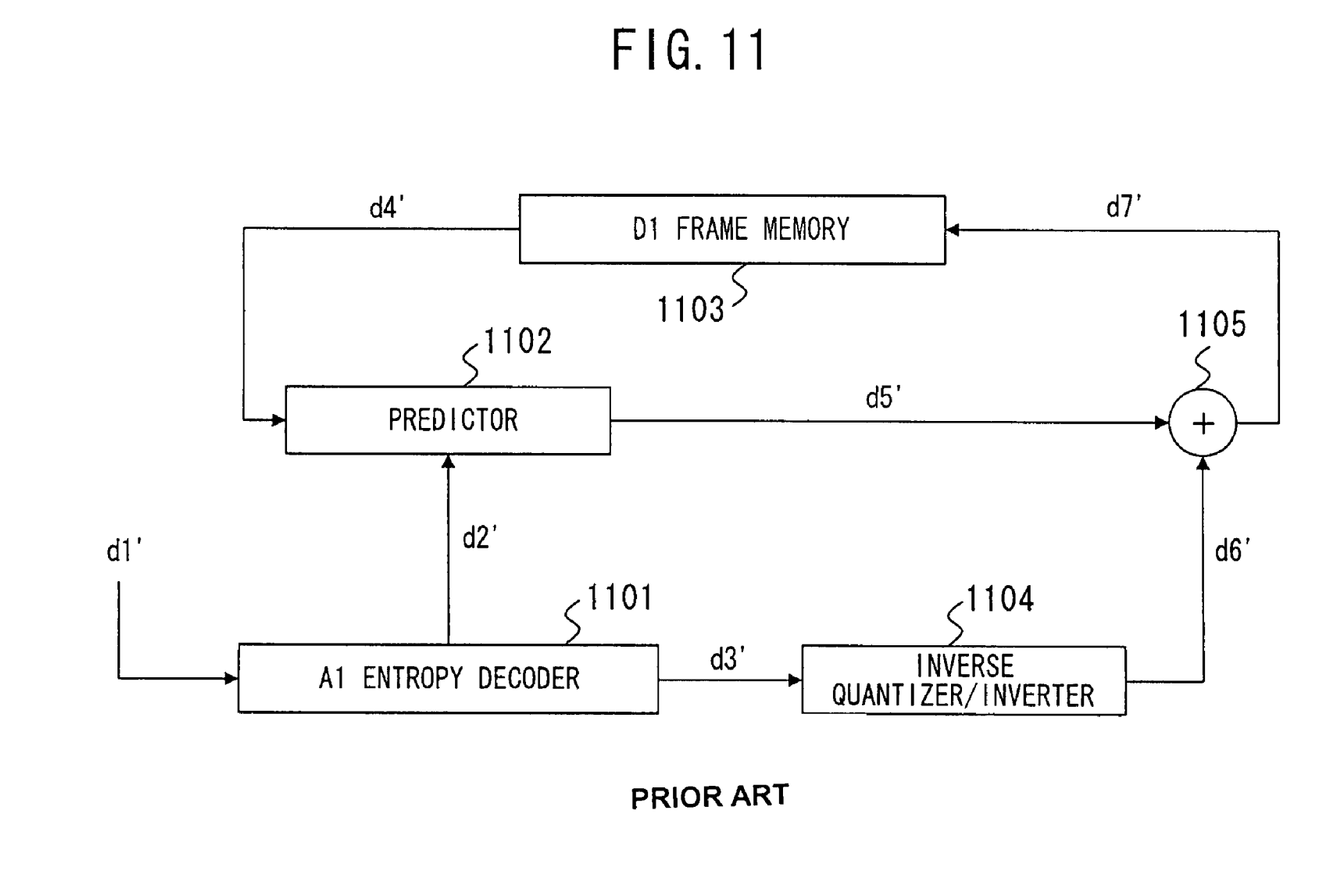
FIG. 11 is a typical configuration diagram of a conventional moving image decoding apparatus performing inter-screen prediction block by block, the block obtained by dividing a screen.

In FIG. 11, a typical configuration of a conventional moving image decoding apparatus performing inter-picture prediction block by block, the block obtained by dividing a screen, is shown.

A mechanism of decoding shown in FIG. 11 is as follows. An encoded bit string d1' is decoded by an entropy decoder 1101, whereby motion vector information d2' and coefficient information d3' are obtained.

In a predictor 1102, a reference image d4' that is an encoded image from a frame memory 1103 and the above-described motion vector d2' are inputted thereto, and a predicted image d5' is created.

On the other hand, in an inverse quantizer/inverter 1104, a difference image d6' is obtained from the coefficient information d3'.

Then, in an adder 1105, the predicted image d5' and the difference image d6' are added, whereby a decoded image d7' is obtained. The decoded image d7' is stored in the frame memory 1103, and is used as a future reference image d4'.

Figure 12:
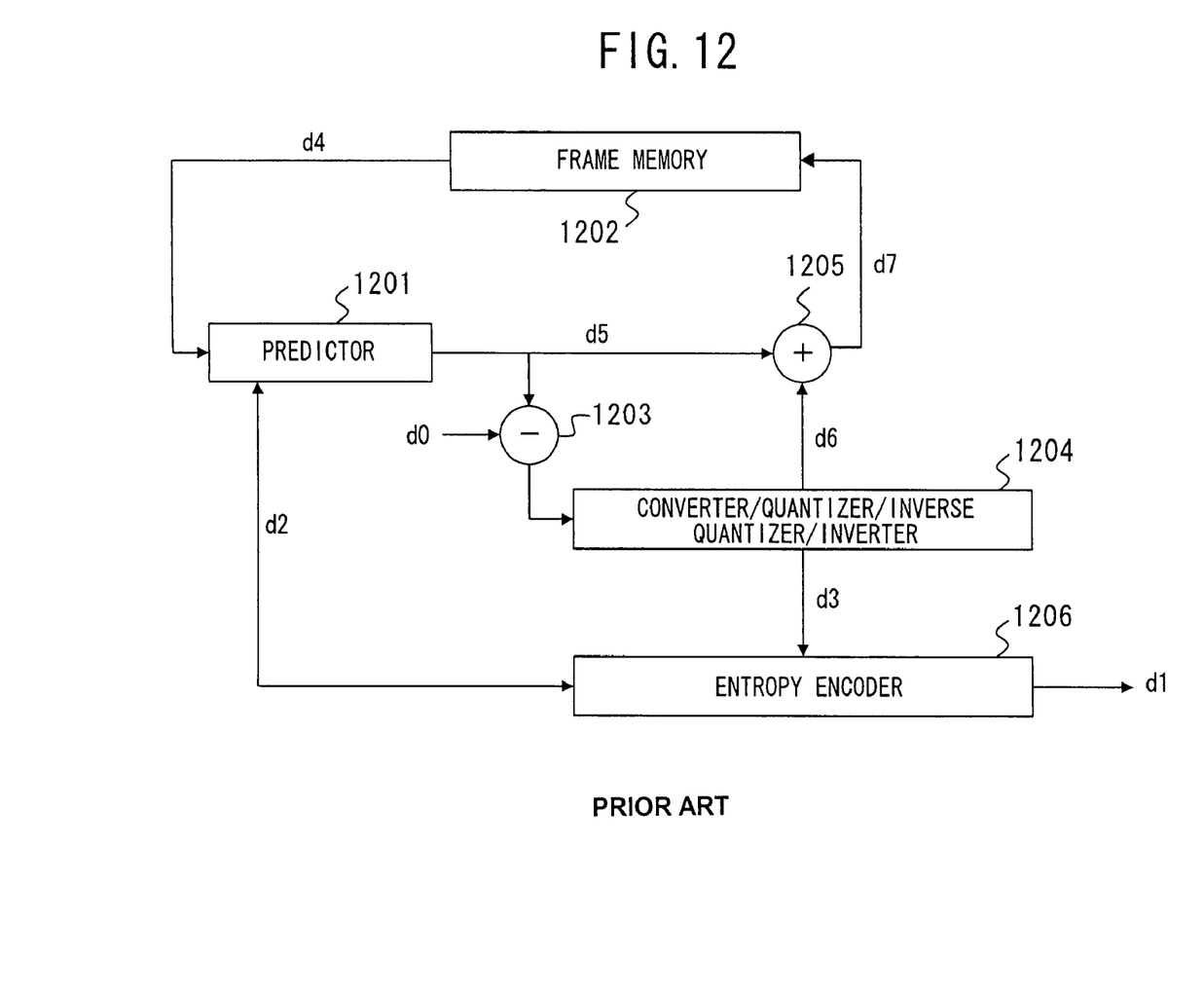
FIG. 12 is a typical configuration diagram of a conventional moving image encoding apparatus performing inter-screen prediction block by block, the block obtained by dividing the screen.

In FIG. 12, a typical configuration of a conventional moving image encoding apparatus corresponding to the moving image decoding apparatus of FIG. 11 is shown.

A mechanism of encoding shown in FIG. 12 is as follows. First, in a predictor 1201, from motion vector information d2 and a reference image d4 read from a frame memory 1202, a predicted image d5 is created.

A difference between the predicted image d5 and an original image d0, the difference outputted from a differentiator 1203, is inputted to a converter/quantizer/inverse quantizer/inverter 1204, whereby a difference image d6 and coefficient information d3 are created.

In an adder 1205, the difference image d6 and the predicted image d5 are added, whereby a decoded image d7 is obtained. The decoded image d7 is stored in the frame memory 1202, and is used as a future reference image d4.

On the other hand, the coefficient information d3 is inputted to an entropy encoder 1206 along with the motion vector information d2, and is encoded into an encoded bit string d1.

As a related art, in JP-A-2007-184800, a technique of separating the entire screen of an original image into a high-frequency component and a low-frequency component, encoding each component, and decoding the images thereof by adding them at the time of decoding is disclosed. In this related art, enhancement of encoding efficiency by transmitting texture information (a high-frequency component and a low-frequency component) separately is disclosed.

Inter-picture prediction in image encoding makes it possible to enhance encoding efficiency by removing correlation between screens. However, with inter-picture prediction, correlation cannot always be removed completely. Specifically, in a part such as an edge part in which high-frequency components are concentrated, a prediction residual tends to remain depending on shooting conditions and conditions such as movement of a subject, characteristics of a camera, and the like, causing a reduction in encoding efficiency.

Figure 13A:
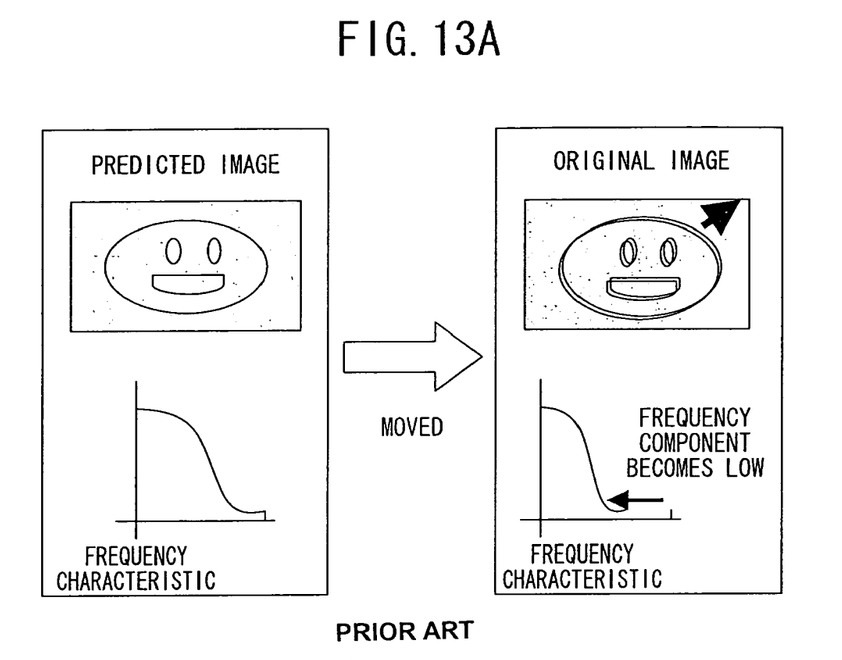
FIGS. 13A and 13B are diagrams for explaining a problem of the conventional technique.
Figure 13B:
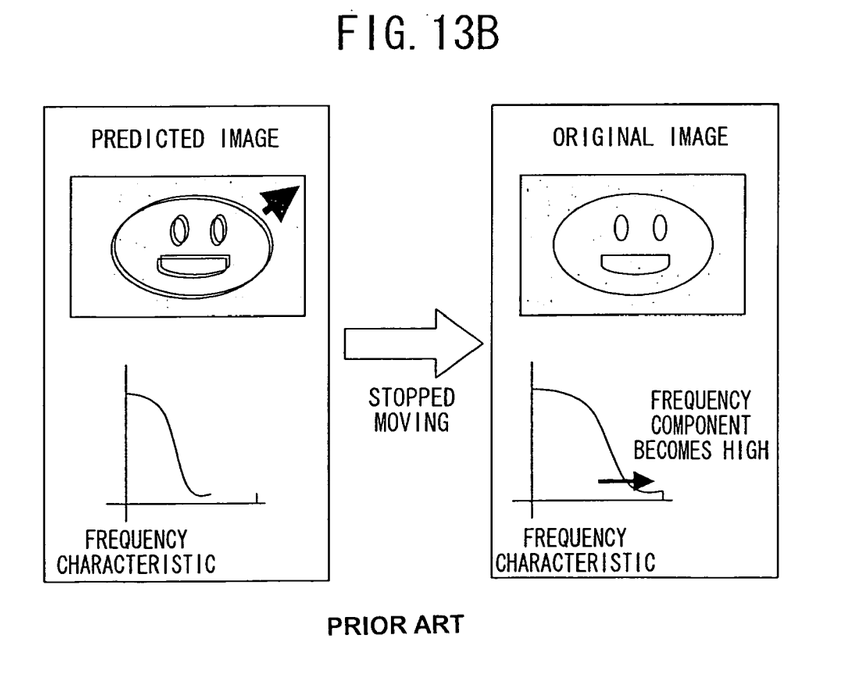

For example, the following discusses moving image encoding when phenomena shown in FIGS. 13A and 13B occur. In an image obtained by shooting a subject with an outline, the outline of the subject appears as an edge. However, a space frequency component of the edge changes with time depending on blurring due to movement of the subject, movement of a camera itself shooting the subject, and conditions such as focus.

In an example shown in FIG. 13A, as a result of movement of an original image that has remained stationary until now, a predicted image is a still image and includes a high-frequency component resulting from an edge. On the other hand, since the original image becomes an image including movement and an edge part becomes blurred, a high-frequency component resulting from an edge is reduced.

By contrast, in an example shown in FIG. 13B, as a result of an original image that has moved until now stopping moving, a predicted image is an image including movement and has a blurred edge part, and therefore there are few high-frequency components resulting from an edge. However, since the original image becomes a still image and an edge part becomes clear, a high-frequency component resulting from an edge is increased.

In each case, a frequency component varies between a predicted image and an original image, causing an increase in a prediction residual. This prediction residual cannot be adequately removed by a predicted image created by using a conventional low-pass filter or sinc filter having a fixed frequency characteristic.

Moreover, the technical trends demand that a prediction residual be reduced without changing a typical configuration of a moving image encoding apparatus, that is, a conventional encoding mechanism as little as possible.

SUMMARY

An image predicting apparatus used in an image encoding apparatus or decoding apparatus and performing encoding or decoding of an image while performing image prediction processing for each macroblock, the image predicting apparatus including a characteristic amount image extracting unit extracting characteristic amount image data from predicted image data obtained as a result of the image prediction processing, a characteristic amount image adjusting unit adjusting the characteristic amount image data according to the predicted image data, and a predicted image combining unit combining the adjusted characteristic amount image data obtained from the characteristic amount image adjusting unit and the predicted image data and outputting the composite predicted image.

DESCRIPTION OF EMBODIMENTS

Hereinafter, with reference to the drawings, various embodiments will be described in detail.

Figure 1:
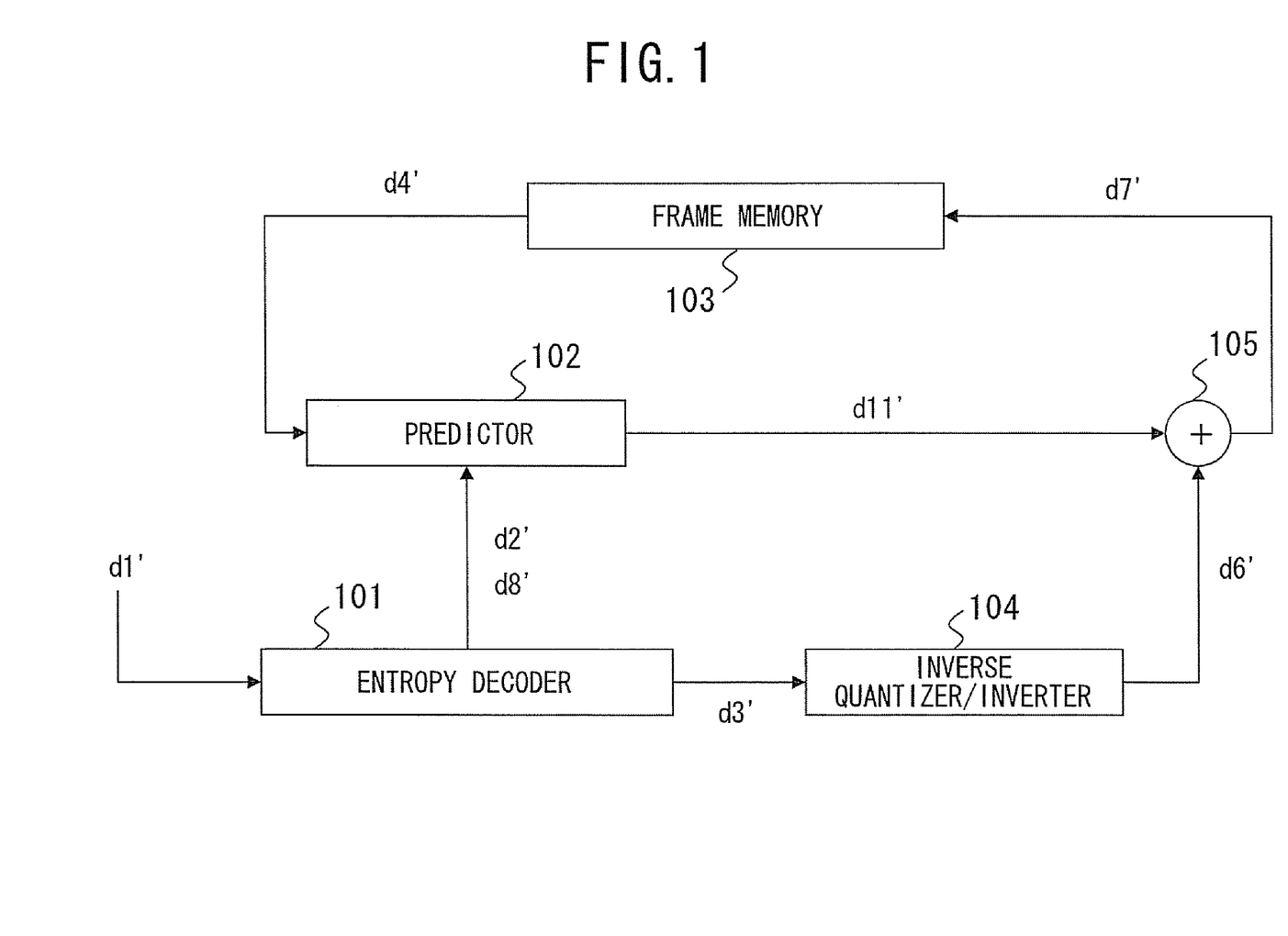
FIG. 1 is a configuration diagram of a decoding apparatus in accordance with an embodiment.
Figure 2:
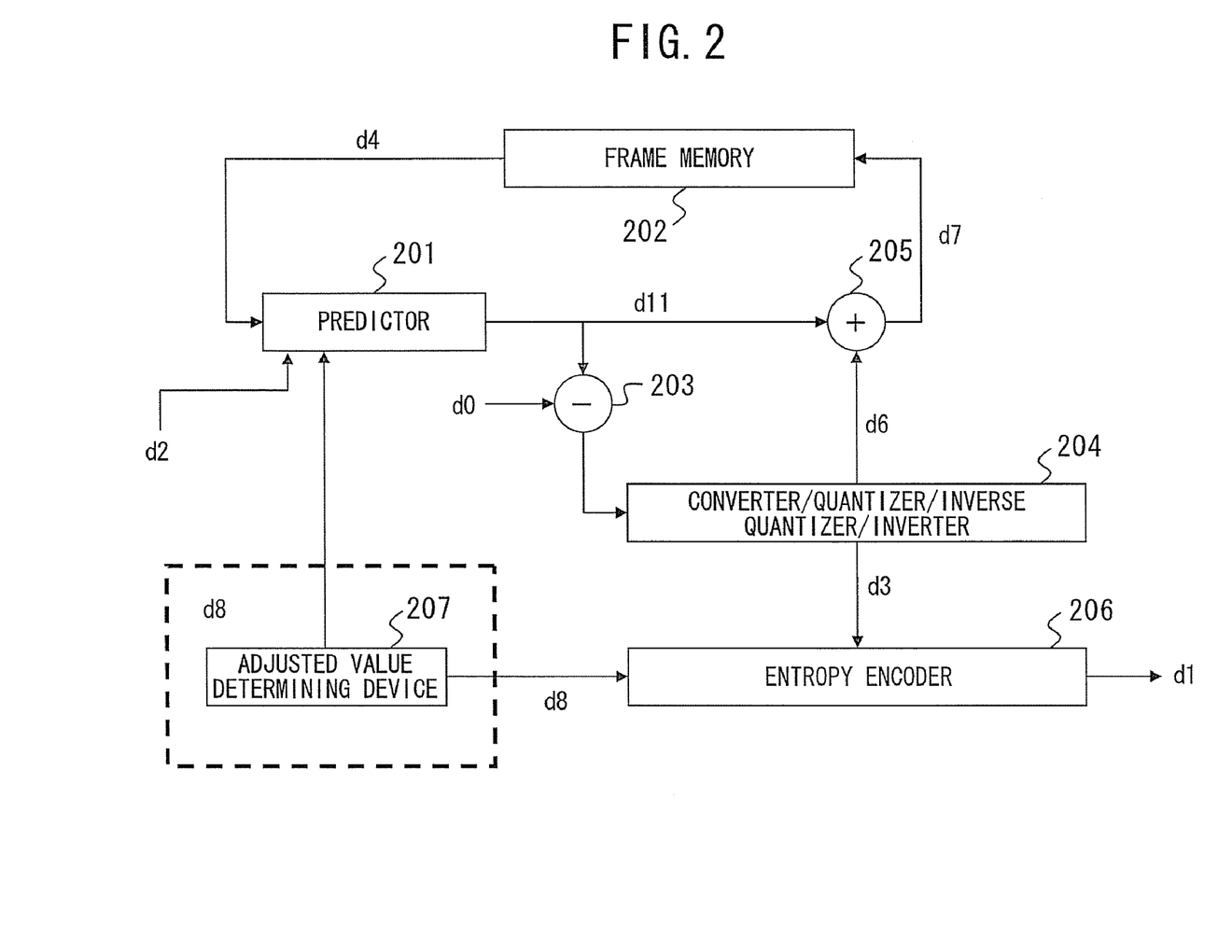
FIG. 2 is a configuration diagram of an encoding apparatus in accordance with the embodiment.

FIG. 1 is a configuration diagram of a decoding apparatus in accordance with an embodiment, and FIG. 2 is a configuration diagram of an encoding apparatus in accordance with the embodiment.

In the configuration of FIG. 1, the functions of a frame memory 103, an inverse quantizer/inverter 104, and an adder 105 are the same as those of 1103, 1104, and 1105, respectively, in the typical configuration of a conventional technique of FIG. 11. Moreover, in the configuration of FIG. 2, the functions of a frame memory 202, a differentiator 203, a converter/quantizer/inverse quantizer/inverter 204, and an adder 205 are the same as those of 1202, 1203, 1204, and 1205, respectively, in the typical configuration of a conventional technique of FIG. 12.

The configurations of FIGS. 1 and 2 in accordance with the embodiment differ from the typical configurations of FIGS. 11 and 12 of the conventional technique in the following respect.

Figure 3:
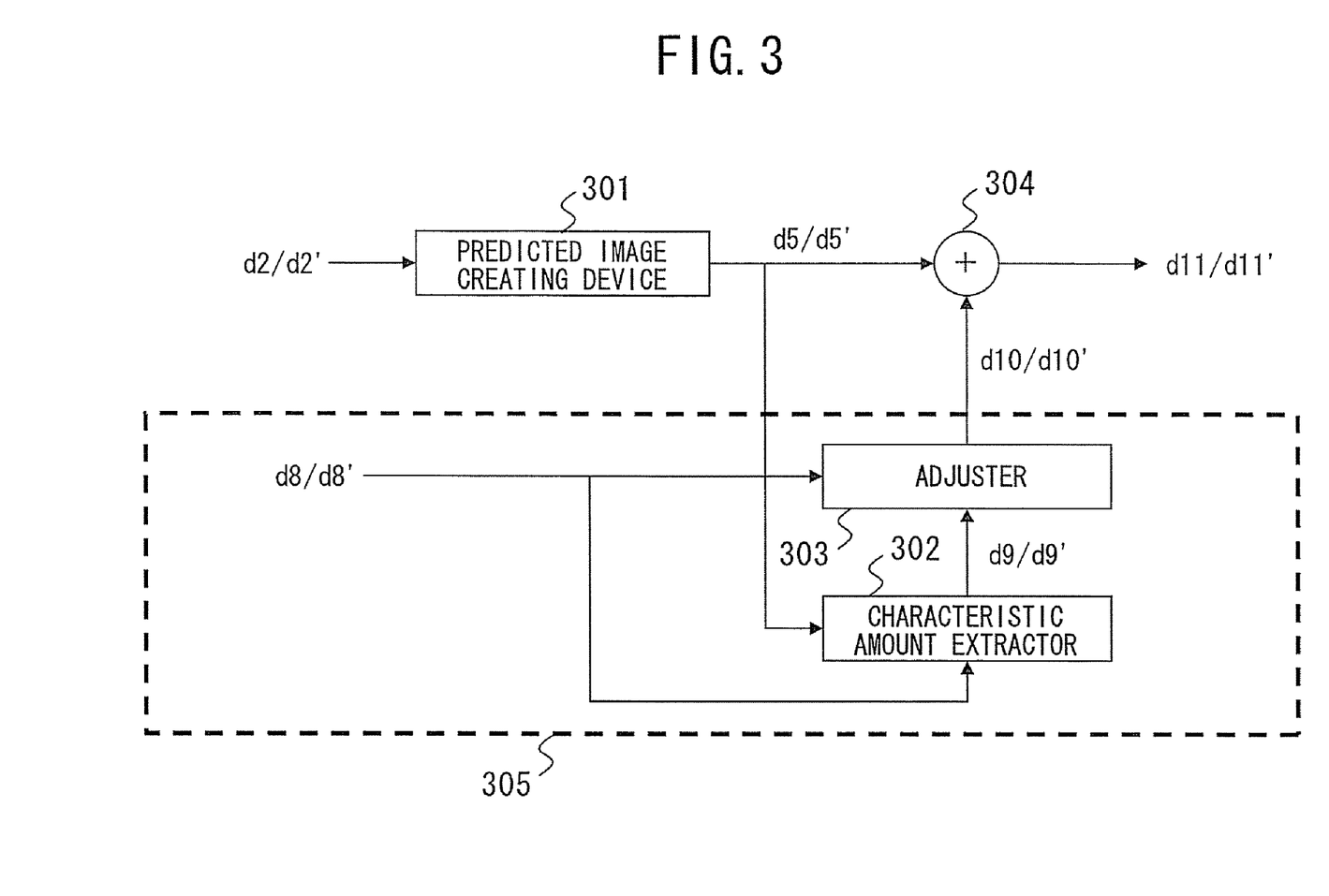
FIG. 3 is a principle configuration diagram of a predictor in accordance with the embodiment.

In the conventional configuration, the predictor 1102 of FIG. 11 and the predictor 1201 of FIG. 12 are formed of a predicted image creating device using a fixed low-pass filter or sinc filter. In this embodiment, as shown in FIG. 3, a predictor 102 of FIG. 1 and a predictor 201 of FIG. 2 have, in addition to a predicted image creating device 301, a second predicted image creating function (a broken line section 305 of FIG. 3) composed of a characteristic amount extractor 302 and an adjuster 303. The prediction results obtained by the predicted image creating device 301 and the second predicted image creating function are added in an adder 304 to obtain a predicted image d11 or d11' of FIG. 1 or 2, whereby encoding efficiency is enhanced.

In FIG. 3, the predicted image creating device 301 creates a predicted image d5 or d5' which is the same as that of a conventional configuration by using a low-frequency pass filter used in a conventional encoding method.

The characteristic amount extractor 302 creates a first characteristic amount image d9 (on the encoding apparatus side) or d9' (on the decoding apparatus side) which is an image containing the amount of characteristic to be adjusted, the amount of characteristic in the predicted image, based on an adjusted value d8 (on the encoding apparatus side) or d8' (on the decoding apparatus side).

Then, various adjustments are made to the first characteristic amount image d9/d9' by the adjuster 303 based on the adjusted value d8/d8', whereby the first characteristic amount image d9/d9' is converted into a second characteristic amount image d10 (on the encoding apparatus side) or d10' (on the decoding apparatus side).

The adder 304 adds the above-described second characteristic amount image d10/d10' to the predicted image d5/d5', and outputs the predicted image d11 (on the encoding apparatus side of FIG. 2) or d11' (on the decoding apparatus side of FIG. 1).

In this configuration, image prediction efficiency is enhanced for an example shown in FIGS. 13A and 13B as follows. The characteristic amount extractor 302 extracts a high-frequency component from the predicted image d5/d5', and generates a first characteristic amount image d9/d9' containing a high proportion of high-frequency component.

The first characteristic amount image d9/d9' is converted into a second characteristic amount image d10/d10', and the second characteristic amount image d10/d10' is added to the predicted image d5/d5' in the adder 304, whereby a predicted image d11/d11' is eventually obtained. At this point, an adjustment is made thereto by the adjuster 303 so as to obtain a predicted image d11/d11' with a higher degree of prediction efficiency. In the example of FIGS. 13A and 13B, an adjustment may be made thereto as follows.

A case shown in FIG. 13A: an edge component is extracted from the predicted image d5/d5', and the component is subtracted from the predicted image d5/d5'. A case shown in FIG. 13B: an edge component is extracted from the predicted image d5/d5', and the component is added to the predicted image d5/d5'. In this way, by adjusting a high-frequency component near the edge, enhancement in prediction accuracy near the edge can be expected.

Figure 4:
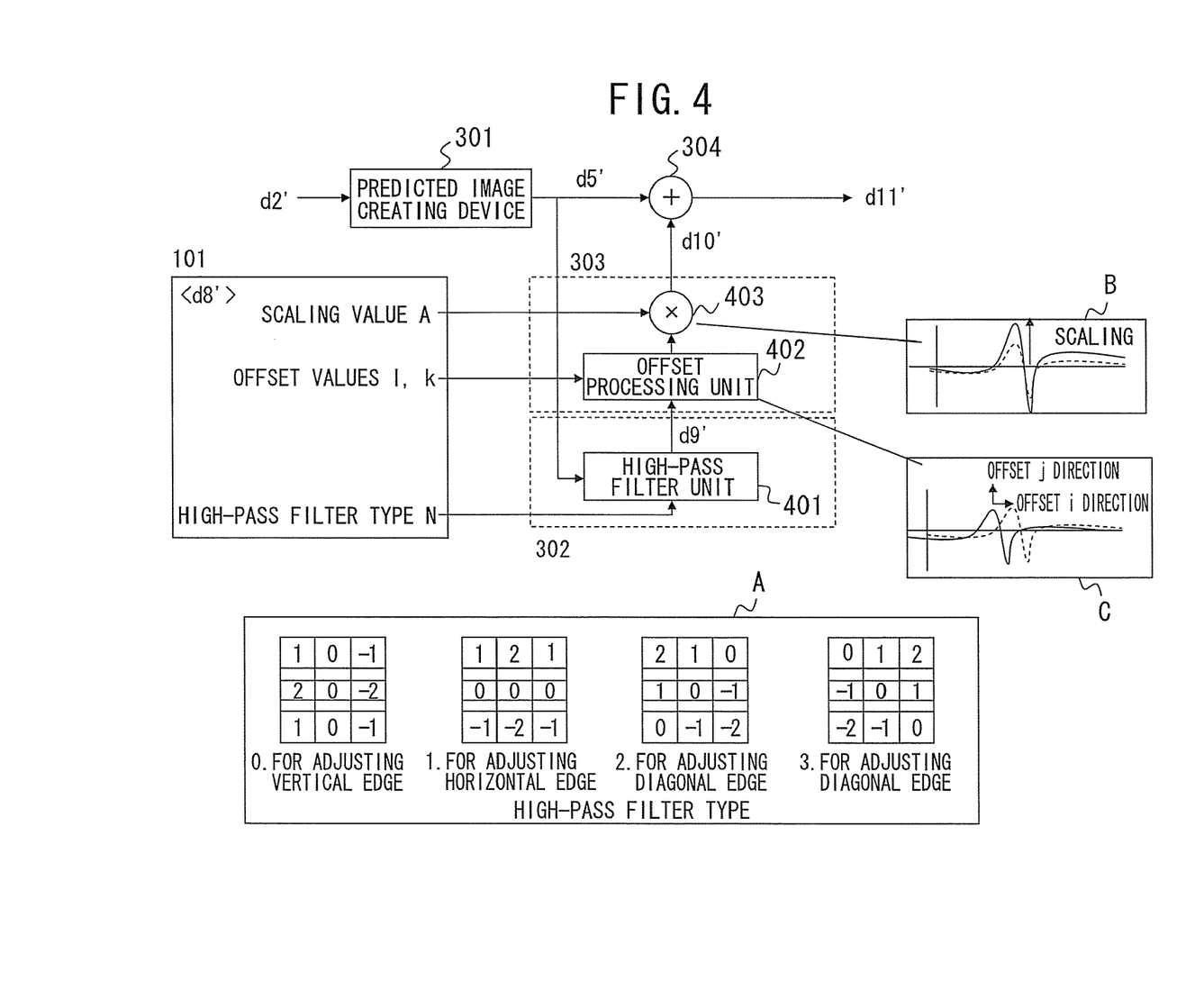
FIG. 4 is a configuration diagram of a predictor in accordance with the embodiment, the predictor applied to the decoding apparatus.
Figure 5:
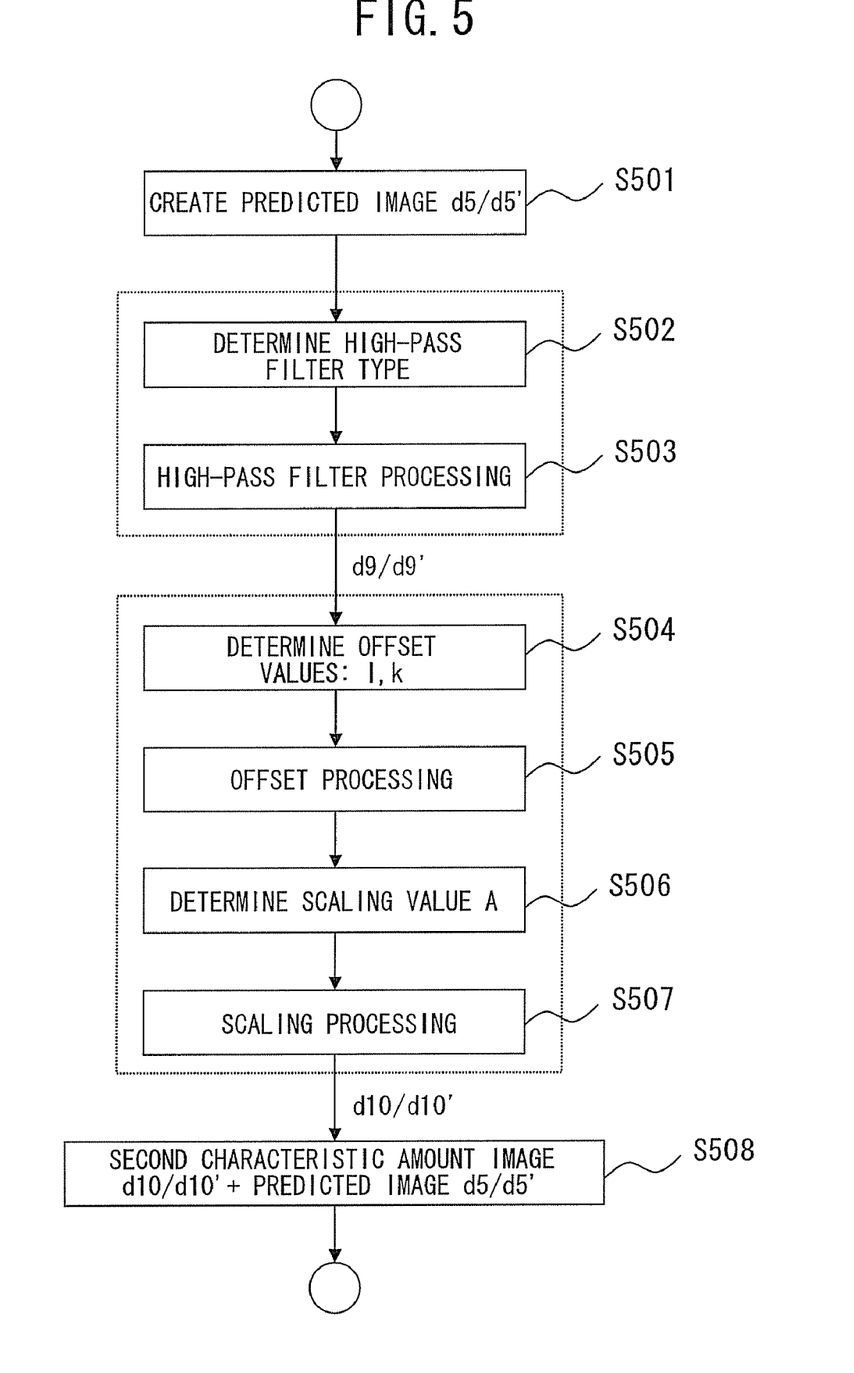
FIG. 5 is an operation flow chart showing control operation of the predictor in accordance with the embodiment.

FIG. 4 is a more detailed configuration diagram of the embodiment when the predictor in the embodiment shown in FIG. 3 is configured as the predictor 102 of the decoding apparatus of FIG. 1. FIG. 5 is an operation flow chart showing control operation thereof.

First, in the predicted image creating device 301, a predicted image d5' is created (step S501 of FIG. 5). Next, in a high-pass filter unit 401 forming the characteristic amount extractor 302 of FIG. 3, a high-pass filter type N is determined (step S502 of FIG. 5), and high-pass filter processing of type N thus determined is executed (step S503 of FIG. 5). With the above processing, a first characteristic amount image d9' is created.

As the high-pass filter type N, space filters extracting edges in vertical, horizontal, and diagonal directions, the space filters shown as A of FIG. 4, are set. Then, in an offset processing unit 402 forming the adjuster 303 of FIG. 3, offset values l and k in an i direction (a horizontal direction in an image) and in a j direction (a perpendicular direction in an image) are determined (step S504 of FIG. 5). Offset processing by which a pixel value is displaced by the determined offset values l and k in the i and j directions, respectively, is performed (step S505 of FIG. 5).

Then, in a multiplier 403 forming the adjuster 303 of FIG. 3, a scaling value A is determined (step S506 of FIG. 5), and scaling processing by which multiplication by the value A is done is performed (step S507 of FIG. 5). With the above processing, a second characteristic amount image d10' is created. Finally, in the adder 304, the predicted image d5' and the second characteristic amount image d10' are added, whereby a predicted image d11' is created.

The above-described series of processing is formulated as follows.

$$C(i,j) = A*C0(i+k, j+1)$$

$$P(i,j) = P0(i,j) + C(k,j) \quad (1)$$

j: coordinates in a predicted image
C0: first characteristic amount image d9/d9' obtained by using the filter type N
C (i, j): second characteristic amount image d10/d10'
P0: predicted image d5/d5'
P: predicted image d11/d11'
A: scaling value in the multiplier 403/503
k, l: offset values (i direction, j direction) in the offset processing unit 402/502

On the decoding apparatus side, the high-pass filter type N determined in step S502 of FIG. 5, the offset values l and k determined in step S504 of FIG. 5, and the scaling value A determined in step S506 of FIG. 5 are extracted from a received encoded bit string d1' (see FIG. 1) as an adjusted value d8' (see FIGS. 1 and 3) in an entropy decoder 101.

Figure 6:
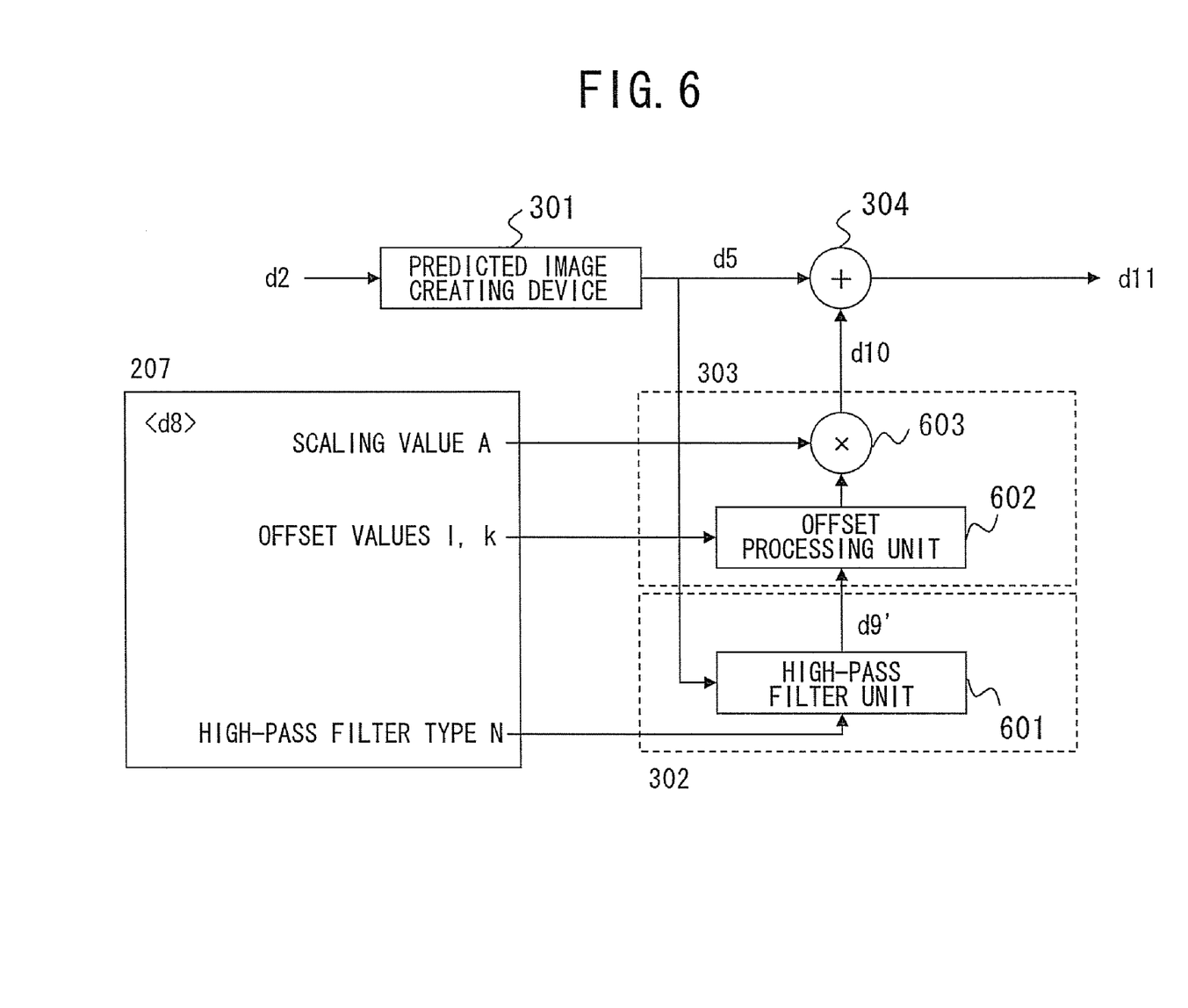
FIG. 6 is a configuration diagram of a predictor in accordance with the embodiment, the predictor applied to the encoding apparatus.

FIG. 6 is a more detailed configuration diagram of the embodiment when the predictor in the embodiment shown in FIG. 3 is configured as the predictor 201 of the encoding apparatus of FIG. 2. The basic function is the same as that of the configuration shown in FIG. 4 on the decoding apparatus side, and the functions of a high-pass filter unit 601, an offset processing unit 602, and a multiplier 603 of FIG. 6 are the same as those of 401, 402, and 403 of FIG. 4. The control operation is also the same as the operation flow chart of FIG. 5.

On the encoding apparatus side, the high-pass filter type N determined in step S502 of FIG. 5, the offset values l and k determined in step S504 of FIG. 5, and the scaling value A determined in step S506 of FIG. 5 are derived by an adjusted value determining device 207 of FIG. 2 as an adjusted value d8.

Figure 7:
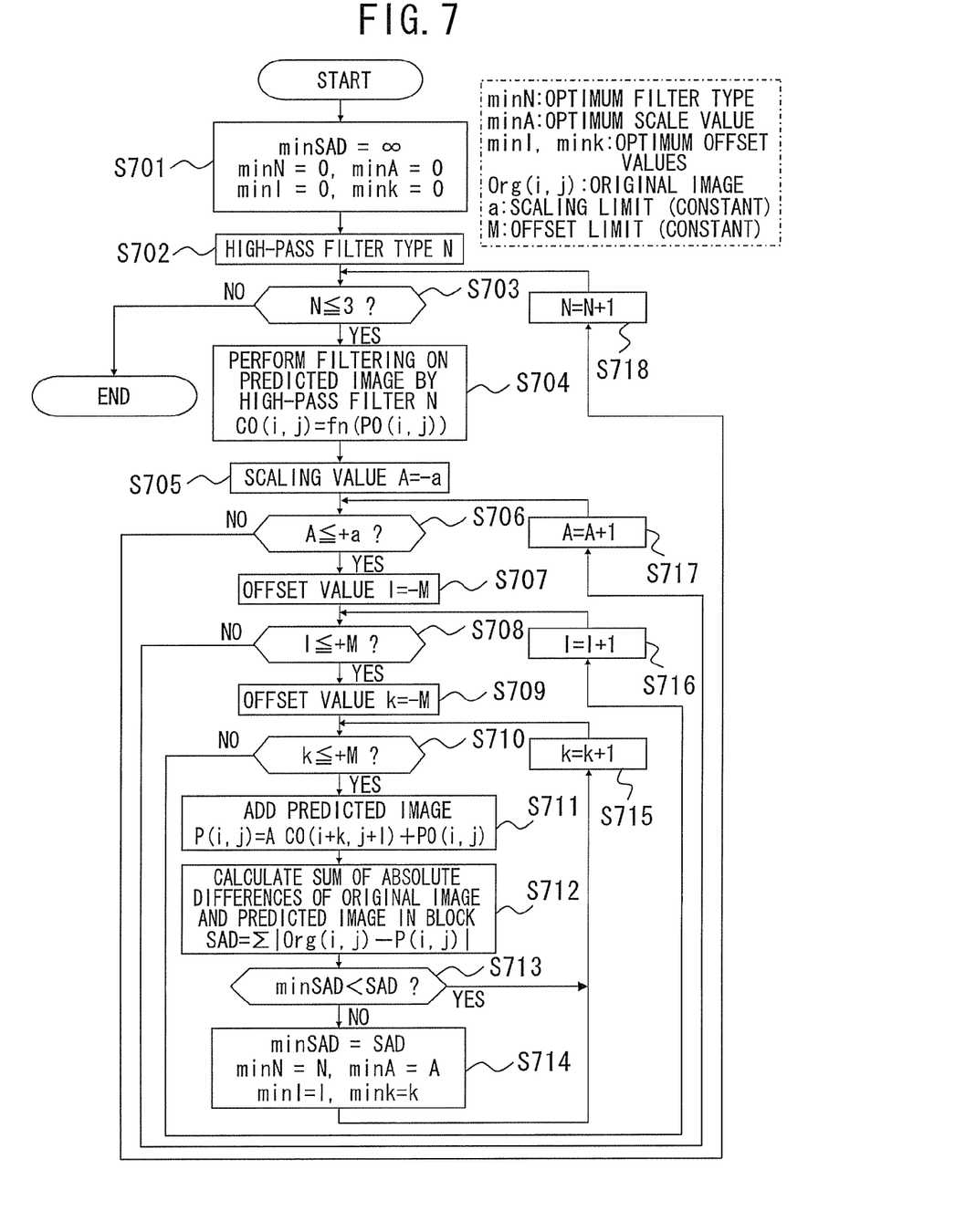
FIG. 7 is an operation flow chart showing a control algorithm for deriving an adjusted value, the control algorithm executed by an adjusted value determining device.

FIG. 7 is an operation flow chart showing a control algorithm for deriving the adjusted value d8, the control algorithm executed by the adjusted value determining device 207. This algorithm calculates the sum of absolute differences of pixels in a block of an original image Org(i, j) and a predicted image P(i, j) by sequentially changing the filter type N, the scaling value A, and the offset values k and l by the unit quantity in their respective limit ranges. The filter type N, the scaling value A, and the offset values k and l are calculated as a combination of these values that minimizes the sum of absolute differences.

Specifically, first, after initialization in step S701, the high-pass filter type N is set to 0 in step S702. Next, until the value of N is found to become greater than 3 in step S703 and it is judged that processing has been performed on all types, processing in the following steps S704 to S717 is repeatedly performed while incrementing the type value by +1 from 0 to 3 in step S718 (see A of FIG. 4).

In steps S704 to S717, first, in step S704, high-pass filter processing by the current high-pass filter type N is performed. In step S705, a value of the scaling value A is set at a lower limit value −a. Until the value of A is found to become greater than an upper limit value +a in step S706 and it is judged that processing has been performed on all scaling values A, processing in the following steps S707 to S716 is repeatedly performed while incrementing the value of A by +1 in step S717.

In steps S707 to S716, first, in step S707, a value of the offset value l is set at a lower limit value −M. Until the value of l is found to become greater than an upper limit value +M in step S708 and it is judged that processing has been performed on all offset values l, processing in the following steps S709 to S715 is repeatedly performed while incrementing the value of l by +1 in step S716.

In steps S709 to S715, first, in step S709, a value of the offset value k is set at a lower limit value −M. Until the value of k is found to become greater than an upper limit value +M in step S710 and it is judged that processing has been performed on all offset values k, processing in the following steps S711 to S714 is repeatedly performed while incrementing the value of k by +1 in step S715.

In step S711, prediction arithmetic processing expressed in the aforementioned equation (1) is performed by using the current offset values k and l and scaling value A. In step S712, the sum of absolute differences SAD in the current encoding target block of the predicted image P(i, j) thus obtained and the original image Org(i, j) is given by equation (2) below.

$$SAD = \Sigma |Org(i,j) - P(i,j)| \quad (2)$$

In step S713, it is judged whether or not a minimum value minSAD of the sums of absolute differences that have been obtained so far is smaller than the sum of absolute differences SAD. Then, if minSAD is found to be equal to or greater than SAD and NO is selected in step S713, in step S714, the values of an optimum filter type minN, an optimum scale value minA, an optimum offset l value minl, and an optimum offset k value mink are replaced with the currently selected values N, A, l, and k.

After processing in step S714, or if YES is selected in step S713, the procedure proceeds to processing in step S715, and the same processing as that described above is repeatedly performed on the next combination of the values N, A, l, and k.

As a result of the above processing, for all the combinations of the values N, A, l, and k, a set of the optimum filter type minN, the optimum scale value minA, the optimum offset l value minl, and the optimum offset k value mink, the set which minimizes the sum of absolute differences, is eventually obtained as an adjusted value d8 (see FIG. 2).

The adjusted value d8 determined as described above is encoded into an encoded bit string dl in an entropy encoder 206 of FIG. 2. The above-described embodiment aims to enhance encoding efficiency by adjusting a frequency component by using a high-pass filter as a characteristic amount image extraction method. Moreover, the embodiment can specify the type of high-pass filter as additional information.

Figure 8:
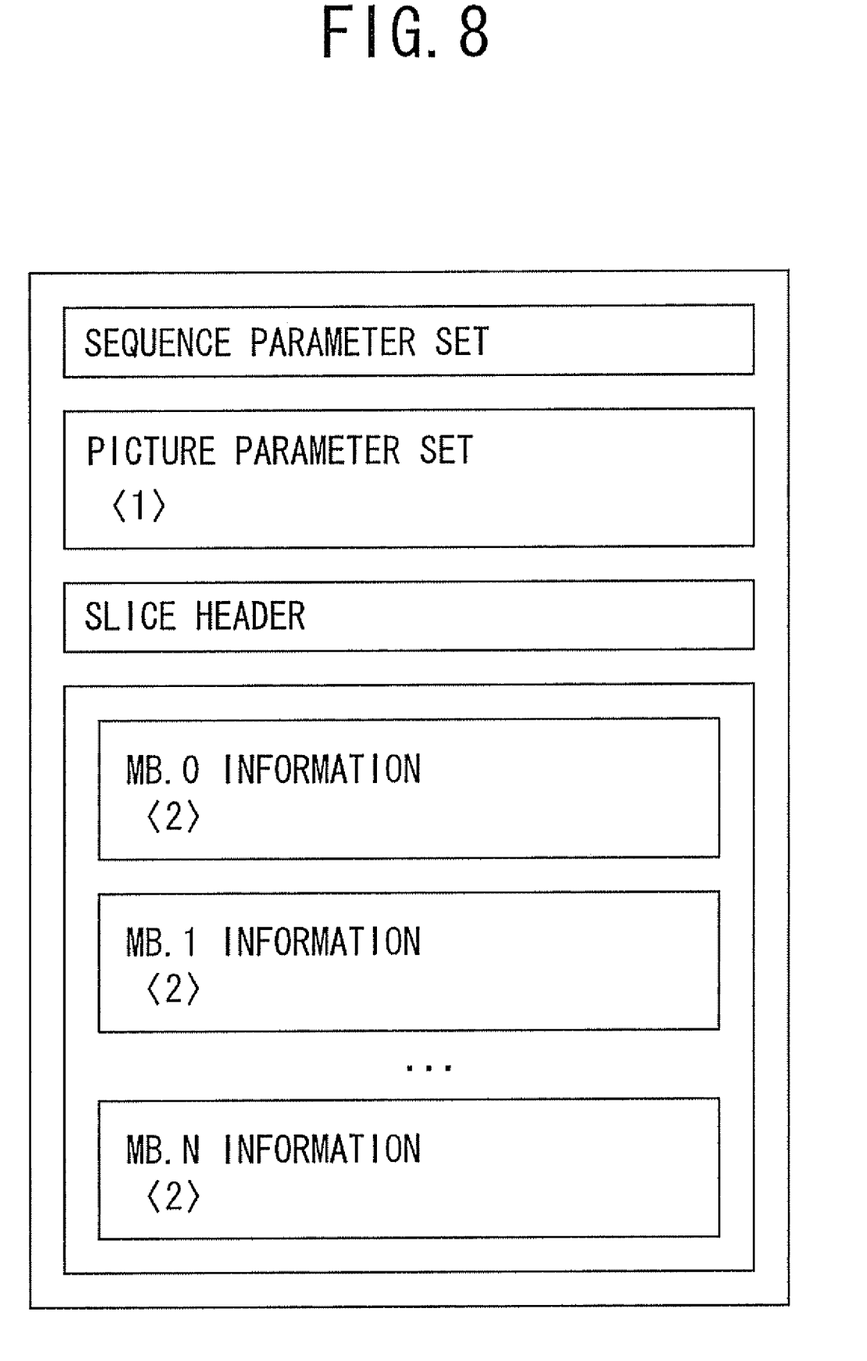
FIG. 8 is a diagram showing an example of data configuration of an encoded bit string in accordance with the embodiment.

As a first method for specifying the filter type N as additional information, a method by which the "filter type" is specified once as additional information in a picture so that extraction of the amount of characteristic is always performed on all macroblocks in the picture in the same manner can be adopted. In FIG. 8, a write format for an encoded bit string d1, the write format complying with ITU-T H.264, which is a standard for video compression encoding recommended by the ITU (International Telecommunication Union), is shown. When the filter type is added for each picture, additional information on the filter type is written in a position <1> of FIG. 8.

As a second method for specifying the filter type N as additional information, a method by which the "filter type" is specified as additional information for each macroblock can be adopted. In this case, additional information on the filter type is written in a position <2> of FIG. 8.

Figure 9:
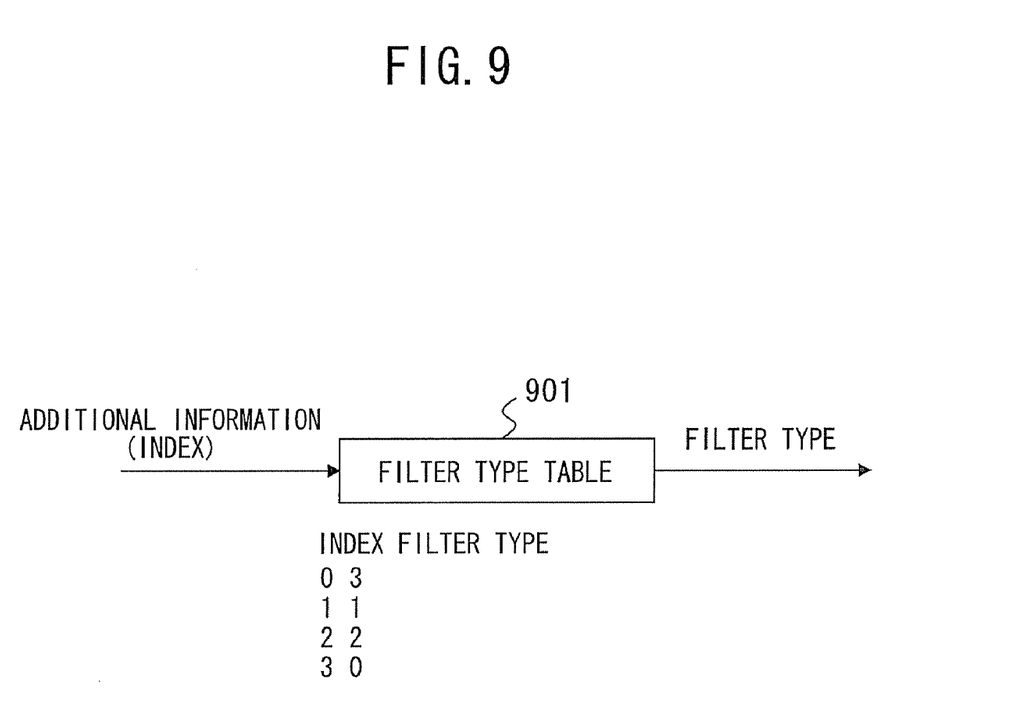
FIG. 9 is a diagram showing a table for switching the filter type in accordance with the embodiment.

As a third method for specifying the filter type N as additional information, a method by which the "filter type" is specified as additional information for each macroblock and the additional information is specified as an index value of a table 901 prepared for each picture as shown in FIG. 9 can be adopted. Also in this case, additional information on the filter type is written in a position <2> of FIG. 8.

The filter type N added to the encoded bit string d1 in the manner as described above is extracted, on the decoding apparatus side, by the entropy decoder 101 of FIG. 1 from the encoded bit string d1' received corresponding to the encoded bit string d1, and is supplied to the high-pass filter unit 401 of FIG. 4.

Next, the scaling value A determined on the encoding apparatus side represents addition strength with which a characteristic amount image is added to a predicted image. As a first method for specifying the scaling value A as additional information, a method by which the "scaling value" is specified once as additional information in a picture so that scaling is always performed on all macroblocks in the picture with the same addition strength can be adopted. In this case, additional information on the scaling value is written in a position <1> of FIG. 8.

As a second method for specifying the scaling value A as additional information, a method by which the "scaling value" is specified as additional information for each macroblock can be adopted. In this case, additional information on the scaling value is written in a position <2> of FIG. 8.

Figure 10:
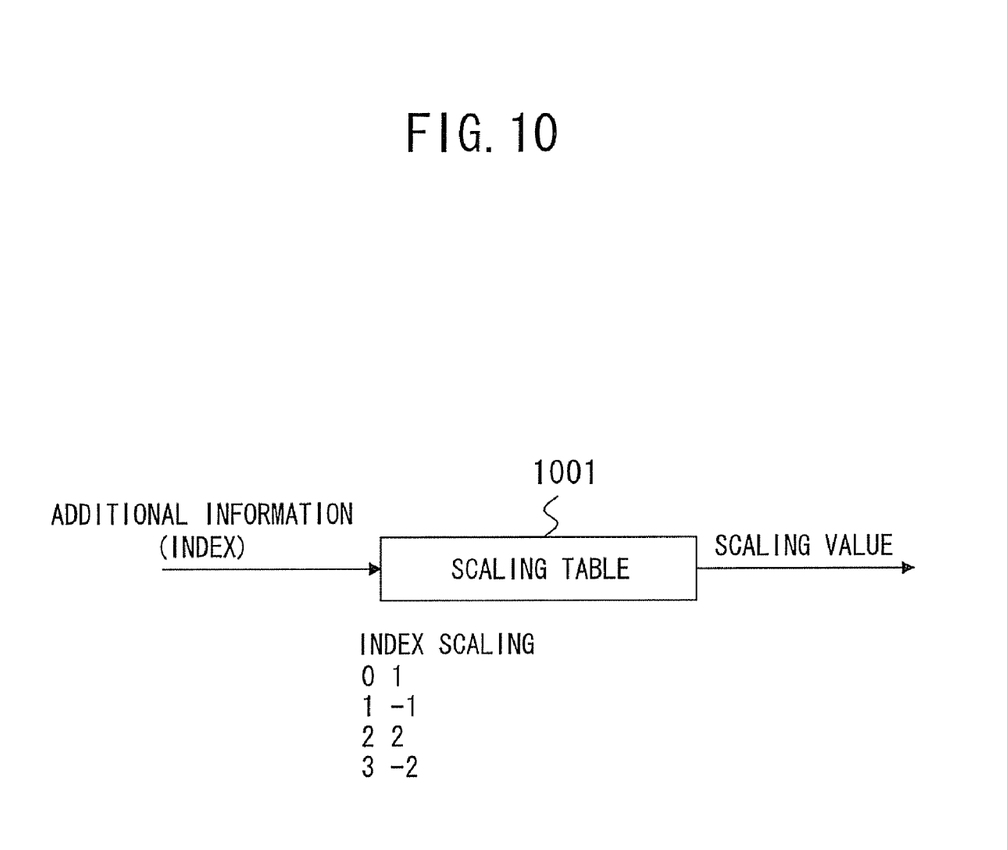
FIG. 10 is a diagram showing a table for switching the scaling value (addition strength) in accordance with the embodiment.

As a third method for specifying the scaling value A as additional information, a method by which the "scaling value" is specified as additional information for each macroblock and the additional information is specified as an index value of a table 1001 prepared for each picture as shown in FIG. 10 can be adopted. Also in this case, additional information on the scaling value is written in a position <2> of FIG. 8.

The filter type information added to the encoded bit string d1 in the manner as described above is extracted, on the decoding apparatus side, by the entropy decoder 101 of FIG. 1 from the encoded bit string d1' received corresponding to the encoded bit string d1, and is supplied to the high-pass filter unit 401 of FIG. 4.

The scaling value A added to the encoded bit string d1 in the manner as described above is extracted, on the decoding apparatus side, by the entropy decoder 101 of FIG. 1 from the encoded bit string d1' received corresponding to the encoded bit string d1, and is supplied to the multiplier 403 of FIG. 4.

Next, as with the scaling value A, the offset values k and l determined on the encoding apparatus side can be processed in the same manner. Additional information on the offset values k and l is written in a position <2> of FIG. 8, for example.

The aforementioned high-pass filter type is determined by the adjusted value determining device 207 of FIG. 2 based on the operation flow chart of FIG. 7. As a method for determining the type without additional information, the type can be determined by using a motion vector (x, y) given to a macroblock.

The following is an example of a determination method.

$$\text{if}(|x/(x*x+y*y)| > \cos(22.5°))$$

$$\text{type}=0$$

$$\text{elseif}(|y/(x*x+y*y)| > \sin(67.5°))$$

$$\text{type}=1$$

$$\text{else if}(x*y<0)$$

$$\text{type}=2$$

$$\text{else}$$

$$\text{type}=3$$

Moreover, for the aforementioned scale value, instead of making the adjusted value determining device 207 of FIG. 2 determine the scale value based on the operation flow chart of FIG. 7, the scale value can be determined according to the following algorithm based on a motion vector (x, y) given to a macroblock.

$$\text{Scale value}=(x*x+y*y)+N$$

In the above-described embodiment, an embodiment related to processing focused on an edge in an image has been described. However, the various embodiments are not limited thereto. The various embodiments can enhance prediction accuracy of a predicted image by extracting a characteristic amount image for various characteristic amounts in an image, modifying it, and then adding it to a predicted image.

According to the various embodiments, it is possible to achieve high encoding/decoding performance by realizing high prediction efficiency in a part such as an edge part in which high-frequency components are concentrated.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image predicting apparatus used in an image encoding apparatus or decoding apparatus and performing encoding or decoding of an image while performing image prediction processing for each macroblock, the image predicting apparatus comprising:
   a characteristic amount image extracting unit extracting characteristic amount image data from predicted image data obtained as a result of the image prediction processing;
   a characteristic amount image adjusting unit adjusting the characteristic amount image data according to the predicted image data; and
   a predicted image combining unit combining the adjusted characteristic amount image data obtained from the characteristic amount image adjusting unit and the predicted image data and outputting a composite predicted image.

2. The image predicting apparatus according to claim 1, wherein
   the characteristic amount image extracting unit extracts the characteristic amount image data while switching a method of extraction of the characteristic amount image data according to the predicted image data.

3. The image predicting apparatus according to claim 2, wherein
   the characteristic amount image extracting unit performs high-pass filter processing for extracting the characteristic amount image data containing an edge component from the predicted image data, and extracts the characteristic amount image data while switching among high-pass filters each extracting a corresponding one of edge components in a plurality of directions according to the predicted image data.

4. The image predicting apparatus according to claim 1, wherein
   the characteristic amount image adjusting unit adjusts a strength of the characteristic amount image data according to the predicted image data.

5. The image predicting apparatus according to claim 1, wherein
   the characteristic amount image adjusting unit adjusts, according to the predicted image data, an offset of a coordinate value used when the characteristic amount image data is combined with the predicted image data by the predicted image combining unit.

6. The image predicting apparatus according to claim 2, wherein
   information for switching a method of extraction of the characteristic amount image data, information for adjusting strength of the characteristic amount image data, or information for adjusting an offset of the coordinate value is stored picture by picture or macroblock by macroblock, the picture or macroblock of the image, in encoded data to be transmitted from or received by the image encoding apparatus or decoding apparatus.

7. The image predicting apparatus according to claim 6, wherein
   the information stored in the encoded data is index information indicating a method of extraction of the characteristic amount image data, strength of the characteristic amount image data, and an offset of the coordinate value.

8. The image predicting apparatus according to claim 2, wherein
   information for switching a method of extraction of the characteristic amount image data or information for adjusting a strength of the characteristic amount image data is determined based on motion vector data to be processed picture by picture or macroblock by macroblock, the picture or macroblock of the image, in the image encoding apparatus or decoding apparatus.

9. The image predicting apparatus according to claim 8, wherein
   the information for switching a method of extraction of the characteristic amount image data is determined based on a direction of motion represented by motion vector data to be processed picture by picture or macroblock by macroblock, the picture or macroblock of the image, in the image encoding apparatus or decoding apparatus.

10. The image predicting apparatus according to claim 8, wherein
    the information for adjusting a strength of the characteristic amount image data is determined based on an amount of motion represented by motion vector data to be processed picture by picture or macroblock by macroblock, the picture or macroblock of the image, in the image encoding apparatus or decoding apparatus.

11. An image encoding apparatus performing image prediction processing for each macroblock and performing predictive encoding by using a result of the image prediction processing, the image encoding apparatus comprising:
    a characteristic amount image extracting unit extracting characteristic amount image data from predicted image data obtained as a result of the image prediction processing;
    a characteristic amount image adjusting unit adjusting the characteristic amount image data according to the predicted image data; and
    a predicted image combining unit combining the adjusted characteristic amount image data obtained from the characteristic amount image adjusting unit and the predicted image data and outputting a composite predicted image, wherein
    predictive encoding is performed by using the composite predicted image obtained by the predicted image combining unit.

12. An image decoding apparatus performing image prediction processing for each macroblock and performing predictive decoding by using a result of the image prediction processing, the image decoding apparatus comprising:
    a characteristic amount image extracting unit extracting characteristic amount image data from predicted image data obtained as a result of the image prediction processing;
    a characteristic amount image adjusting unit adjusting the characteristic amount image data according to the predicted image data; and
    a predicted image combining unit combining the adjusted characteristic amount image data obtained from the characteristic amount image adjusting unit and the predicted image data and outputting a composite predicted image, wherein predictive decoding is performed by using the composite predicted image obtained by the predicted image combining unit.

13. An image prediction method used in an image encoding method or decoding method and performing encoding or decoding of an image while performing image prediction processing for each macroblock, the image prediction method comprising:

extracting characteristic amount image data from predicted image data obtained as a result of the image prediction processing;

adjusting the characteristic amount image data according to the predicted image data; and combining the adjusted characteristic amount image data obtained in the adjusting and the predicted image data and outputting the composite predicted image.

* * * * *